(12) United States Patent
Weydert et al.

(10) Patent No.: US 6,848,487 B2
(45) Date of Patent: Feb. 1, 2005

(54) PNEUMATIC TIRE HAVING A RUBBER COMPONENT CONTAINING A RUBBER GEL AND STARCH COMPOSITE

(75) Inventors: Marc Weydert, Luxembourg (LU); Georges Marcel Victor Thielen, Schouweiler (LU); Stephan Franz Westermann, Trier (DE); Filomeno Gennaro Corvasce, Mertzig (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 126 days.

(21) Appl. No.: 10/324,156

(22) Filed: Dec. 19, 2002

(65) Prior Publication Data

US 2004/0122134 A1 Jun. 24, 2004

(51) Int. Cl.$^7$ .................................................. B60C 1/00
(52) U.S. Cl. ....................... 152/525; 152/450; 152/451; 152/458; 524/52; 524/502
(58) Field of Search .................... 524/52, 502; 152/450, 152/451, 458, 525

(56) References Cited

U.S. PATENT DOCUMENTS

| | | | |
|---|---|---|---|
| 5,395,891 A | 3/1995 | Obrecht et al. ............. | 525/194 |
| 5,672,639 A | * 9/1997 | Corvasce et al. ............. | 524/52 |
| 6,127,488 A | 10/2000 | Obrecht et al. ........... | 525/333.3 |
| 6,133,364 A | 10/2000 | Obrecht et al. ............. | 524/495 |
| 6,184,296 B1 | 2/2001 | Obrecht et al. ............. | 525/232 |
| 6,207,757 B1 | 3/2001 | Obrecht et al. ............. | 525/194 |
| 6,242,534 B1 | 6/2001 | Obrecht et al. ............. | 525/191 |
| 6,273,163 B1 | 8/2001 | Materne et al. ............. | 152/548 |
| 6,372,857 B1 | 4/2002 | Obrecht et al. ........... | 525/332.6 |

FOREIGN PATENT DOCUMENTS

| | | | | |
|---|---|---|---|---|
| EP | 1 038 697 A1 | 9/2000 | ............. | B60C/1/00 |
| EP | 1 241 219 A1 | 9/2002 | ........... | C08L/21/00 |

* cited by examiner

*Primary Examiner*—Ana Woodward
(74) *Attorney, Agent, or Firm*—John D. DeLong

(57) ABSTRACT

A pneumatic tire having a rubber component comprised of
(A) 100 parts by weight (phr) of a rubber containing olefinic unsaturation;
(B) from 0 to 100 phr of a filler selected from carbon black and silica; and
(C) from 5 to 50 phr of a starch/plasticizer composite and a rubber gel selected from the group consisting of polybutadiene gel, styrene butadiene gel, acrylonitrile-butadiene gel, chloroprene gel, natural rubber gel, and mixtures thereof, wherein the weight ratio of starch/composite to rubber gel is from about 10:1 to about 1:10.

17 Claims, No Drawings

PNEUMATIC TIRE HAVING A RUBBER COMPONENT CONTAINING A RUBBER GEL AND STARCH COMPOSITE

BACKGROUND OF THE INVENTION

U.S. Pat. No. 5,395,891 discloses rubber mixtures containing a polybutadiene gel. The rubber mixtures are disclosed for use in the tread of a pneumatic tire.

U.S. Pat. No. 6,127,488 discloses rubber mixtures prepared from at least one styrene butadiene rubber gel, and at least one rubber which contains double bonds.

U.S. Pat. No. 5,672,639 discloses rubber compositions containing a starch/plasticizer composite. The rubber composition is disclosed for used in the tread or other components of a pneumatic tire.

U.S. Pat. No. 6,184,296 discloses rubber mixtures containing rubber gel modified with compounds containing sulfur and reaction toward carbon-carbon double bonds, and at least one rubber containing double bonds.

U.S. Pat. Nos. 6,242,534; 6,207,757; 6,372,857; 6,133,364 disclose rubber mixtures containing at least one rubber component, and at least one rubber gel as a filler.

SUMMARY OF THE INVENTION

The present invention is directed to a pneumatic tire having a rubber component comprised of
(A) 100 parts by weight (phr) of a rubber containing olefinic unsaturation;
(B) from 20 to 100 phr of a filler selected from carbon black and silica; and
(C) from 5 to 25 phr of a starch/plasticizer composite and a rubber gel selected from the group consisting of polybutadiene gel, styrene butadiene gel, acrylonitrile-butadiene gel, chloroprene gel, natural rubber gel, and mixtures thereof, wherein the weight ratio of starch/composite to rubber gel is from about 5:1 to about 1:5.

DETAILED DESCRIPTION OF THE INVENTION

There is disclosed a pneumatic tire having a rubber component comprised of
(A) 100 parts by weight (phr) of a rubber containing olefinic unsaturation;
(B) from 0 to 100 phr of a filler selected from carbon black and silica; and
(C) from 5 to 50 phr of a starch/plasticizer composite and a rubber gel selected from the group consisting of polybutadiene gel, styrene butadiene gel, acrylonitrile-butadiene gel, chloroprene gel, natural rubber gel, and mixtures thereof, wherein the weight ratio of starch/composite to rubber gel is from about 10:1 to about 1:10.

A critical ingredient used in the rubber component is a rubber gel. The term "rubber gel" is used herein to describe polybutadiene gel, styrene butadiene gel, acrylonitrile-butadiene gel, chloroprene gel and natural rubber gel. The preferred gels are polybutadiene gel and styrene butadiene gel. Suitable gels are described in and may be produced by methods as are taught in U.S. Pat. Nos. 5,395,891; 6,127,488; 6,184,296; 6,242,534; 6,207,757; 6,372,857; and 6,133,364.

Representative styrene butadiene gels which may be used for use in the present invention are described in U.S. Pat. No. 6,127,488 which is incorporated by reference in its entirety.

The rubber gels also include such polymeric copolymers grafted with polar unsaturated monomers such as acrylic acid, methacrylic acid, acrylamide, methacrylamide, N-methoxymethyl methacrylic acid amide, N-methoxymethyl methacrylic acid amide, N-acetoxymethyl methacrylic acid amide, acrylonitrile, dimethyl acrylamide, hydroxyethyl acrylate, hydroxyethyl methacrylate, hydroxypropyl acrylate, hydroxypropyl methacrylate, hydroxybutyl acrylate, hydroxybutyl methacrylate and mixtures thereof. The grafted rubber gel may have from 1 to 20 weight percent of its makeup derived from the polar monomers.

The rubber gels have particle diameters of from 20 to 1000, preferably 30 to 400 nm (DVN value to DIN 53 206) and swelling indices ($Q_i$) in toluene of from 1 to 15, preferably 1 to 10. The swelling index is calculated from the weight of the gel when it contains solvent (following centrifuging at 20,000 rpm) and its weight when dry:

$$Q_i = \text{wet weight of gel/dry weight of gel}$$

As an example of determining the swelling index, 250 mg of SBR gel is swelled in 25 ml toluene for 24 hours, with shaking. The gel is centrifuged off and weighed, and is then dried at 70° C. until the weight is constant, and is reweighed.

The stryene butadiene rubber starting products are preferably prepared by emulsion polymerization. In this connection see, for example, I. Franta, *Elastomers and Rubber Compounding Materials*, Elsevier, Amsterdam 1989, Pages 88 to 92.

The styrene butadiene rubber gels are intended to include microgels which are prepared by cross-linking styrene butadiene copolymer which contain from 1 to 80 percent by weight styrene and 99 to 20 percent by weight butadiene. Preferably from 5 to 50 weight percent of the SBR is derived from styrene and the balance being derived from butadiene.

The cross-linking of the rubber starting products to form styrene butadiene rubber gels takes place in the latex state. This may be during polymerization, as a result of continuing the polymerization to high conversions, or in the monomer feeding process as a result of polymerization at high internal conversions, or as a result of post-cross-linking after polymerization, or both processes may be combined. The rubber starting products may also be prepared by polymerization in the absence of regulators.

The styrene butadiene rubber and polybutadiene rubber may also be cross-linked by copolymerization with multifunctional compounds having a cross-linking action. Preferred multifunctional comonomers are compounds having at least two, preferably 2 to 4, copolymerizable C=C double bonds, such as diisopropenylbenzene, divinylbenzene, divinylether, divinylsulphone, diallyl phthalate, triallyl cyanurate, triallyl isocyanurate, 1,2-polybutadiene, N,N'-m-phenylene maleic imide and/or triallyl trimellitate. The following are furthermore considered: acrylates and methacrylates of polyvalent, preferably divalent to tetravalent, $C_2$–$C_{10}$ alcohols, such as ethylene glycol, propanediol-1,2, butanediol, hexanediol, polyethylene glycol, having 2 to 20, preferably 2 to 8 oxyethylene units, neopentyl glycol, bisphenol A, glycerol, trimethylol propane, pentaerythritol, sorbitol and unsaturated polyesters prepared from aliphatic diols and polyols and maleic acid, fumaric acid and/or itaconic acid.

The styrene butadiene rubbers, as well as the natural rubber, polybutadiene rubber, NBR and chloroprene rubber, may also be cross-linked in the latex form to form rubbers gels, as a result of post-cross-linking them with chemicals having a cross-linking action. Suitable chemicals having a cross-linking action are, for example, organic peroxides, for example, dicumyl peroxide, t-butylcumyl peroxide, bis-(t-butyl-peroxyisopropyl) benzene, di-t-butyl peroxide, dibenzoyl peroxide, bis-(2,4-dichlorobenzoyl) peroxide, t-butyl perbenzoate, and organic azo compounds such as azo-bis-isobutyronitrile and azo-bis-cyclohexanenitrile, and dimercapto and polymercapto compounds such as dimercaptoethane, 1,6-dimercaptohexane, 1,3,5-trimercaptotriazine and mercapto-terminating polysulphide rubbers such as mercapto-terminating reaction products of bis-chloroethyl formal with sodium polysulphide. The optimal temperature for the post-cross-linking operation is naturally dependent on the reactivity of the cross-linking agent and may be from room temperature up to approximately 170° C., optionally at elevated pressure. See in this context Houben-Weyl, *Methoden der organischen Chemic [Methods in Organic Chemistry]*, 4$^{th}$ Edition, Volume 14/2, Page 848. Peroxides are particularly preferred cross-linking agents.

It is also optionally possible to enlarge the particles by agglomeration before, during, or after the post-cross-linking in latex form.

Styrene butadiene rubbers, as well as the other rubbers which have been prepared in organic solvents, may also serve as starting products for the preparation of the respective rubber gels. In this case, it is advisable to emulsify the rubber solution in water, optionally with the aid of an emulsifying agent, and to follow this, either before or after removing the organic solvent, with cross-linking of the emulsion thus obtained using suitable cross-linking agents. The cross-linking agents previously named are suitable cross-linking agents.

The polybutadiene gel may be produced by emulsion polymerization (see, for example, M. Morton, P. P. Salatiello, H. Landfield, *J. Polymer Science* 8,2 (1952), Pages 215 through 224; P. A. Weerts, J. L. M. van der Loos, A. L. German, Makromol. Chem. 190 (1989), Pages 777 through 788). These references are incorporated by reference in their entirety.

The size of the latex particles (DVN value according to DIN 53 2016) is preferably 30 to 500 nm.

Production by polymerization in the absence of regulators is also possible.

The second critical ingredient in the rubber used in the rubber component is a starch/plasticizer composite.

In one embodiment, the starch/synthetic plasticizer composite may be composed of amylose units and amylopectin units in a ratio of about 15/85 to about 35/65, alternatively about 20/80 to about 30/70, and has a softening point according to ASTM No. D1228 in a range of about 180° C. to about 220° C.; and the starch/plasticizer has a softening point in a range of about 110° C. to about 170° C. according to ASTM No. D1228.

The starch/plasticizer composite may be desired to be used, for example, as a free flowing, dry powder or in a free flowing, dry pelletized form. In practice, it is desired that the synthetic plasticizer itself is compatible with the starch, and has a softening point lower than the softening point of the starch so that it causes the softening of the blend of the plasticizer and the starch to be lower than that of the starch alone. This phenomenon of blends of compatible polymers of differing softening points having a softening point lower than the highest softening point of the individual polymer(s) in the blend is well known to those having skill in such art.

The plasticizer effect for the starch/plasticizer composite, (meaning a softening point of the composite being lower than the softening point of the starch), can be obtained through use of a polymeric plasticizer such as, for example, poly(ethylenevinyl alcohol) with a softening point of less than 160° C. Other plasticizers, and their mixtures, are contemplated for use in this invention, provided that they have softening points of less than the softening point of the starch, and preferably less than 160° C., which might be, for example, one or more copolymers and hydrolyzed copolymers thereof selected from ethylene-vinyl acetate copolymers having a vinyl acetate molar content of from about 5 to about 90, alternatively about 20 to about 70, percent, ethylene-glycidal acrylate copolymers and ethylene-maleic anhydride copolymers. Hydrolysed forms of copolymers are also contemplated. For example, the corresponding ethylene-vinyl alcohol copolymers, and ethylene-acetate vinyl alcohol terpolymers may be contemplated so long as they have a softening point lower than that of the starch and preferably lower than 160° C.

In general, the blending of the starch and plasticizer involves what are considered or believed herein to be relatively strong chemical and/or physical interactions between the starch and the plasticizer.

In general, the starch/plasticizer composite has a desired starch to plasticizer weight ratio in a range of about 0.5/1 to about 4/1, alternatively about 1/1 to about 3/1, so long as the starch/plasticizer composition has the required softening point range, and preferably, is capable of being a free flowing, dry powder or extruded pellets, before it is mixed with the elastomer(s).

While the synthetic plasticizer(s) may have a viscous nature at room temperature, or at about 23° C. and, thus, considered to be a liquid for the purposes of this description, although the plasticizer may actually be a viscous liquid at room temperature since it is to be appreciated that many plasticizers are polymeric in nature.

Representative examples of synthetic plasticizers are, for example, poly(ethylenevinyl alcohol), cellulose acetate and diesters of dibasic organic acids, so long as they have a softening point sufficiently below the softening point of the starch with which they are being combined so that the starch/plasticizer composite has the required softening point range.

Preferably, the synthetic plasticizer is selected from at least one of poly(ethylenevinyl alcohol) and cellulose acetate.

For example, the aforesaid poly(ethylenevinyl alcohol) might be prepared by polymerizing vinyl acetate to form a poly(vinylacetate) which is then hydrolyzed (acid or base catalyzed) to form the poly(ethylenevinyl alcohol). Such reaction of vinyl acetate and hydrolyzing of the resulting product is well known those skilled in such art.

For example, vinylalcohol/ethylene (60/40 mole ratio) copolymers can be obtained in powder forms at different molecular weights and crystallinities such as, for example, a molecular weight of about 11700 with an average particle size of about 11.5 microns or a molecular weight (weight average) of about 60,000 with an average particle diameter of less than 50 microns.

Various blends of starch and ethylenevinyl alcohol copolymers can then be prepared according to mixing procedures well known to those having skill in such art. For example, a procedure might be utilized according to a recitation in the patent publication by Bastioli, Bellotti and Del Trediu entitled *A Polymer Composition Including Destructured Starch An Ethylene Copolymer*, U.S. Pat. No. 5,403,374.

Other plasticizers might be prepared, for example and so long as they have the appropriate Tg and starch compatibility requirements, by reacting one or more appropriate organic dibasic acids with aliphatic or aromatic diol(s) in a reaction which might sometimes be referred to as an "esterification condensation reaction". Such esterification reactions are well known to those skilled in such art.

The starch is recited as being composed of amylose units and/or amylopectin units. These are well known components of starch. Typically, the starch is composed of a combination of the amylose and amylopectin units in a ratio of about 25/75. A somewhat broader range of ratios of amylose to amylopectin units is recited herein in order to provide a starch for the starch composite which interact with the plasticizer somewhat differently. For example, it is considered herein that suitable ratios may be from about 20/80 up to 100/0, although a more suitable range is considered to be about 15/85 to about 35/63.

The starch can typically be obtained from naturally occurring plants. The starch/plasticizer composition can be present in various particulate forms such as, for example, fibrils, spheres or macromolecules, which may, in one aspect, depend somewhat upon the ratio of amylose to amylopectin in the starch as well as the plasticizer content in the composite.

The relative importance, if any, of such forms of the starch is the difference in their reinforcing associated with the filler morphology. The morphology of the filler primarily determines the final shape of the starch composite within the elastomer composition, in addition, the severity of the mixing conditions such as high shear and elevated temperature can allow to optimize the final filler morphology. Thus, the starch composite, after mixing, may be in a shape of one or more of hereinbefore described forms.

It is important to appreciate that the starch, by itself, is hydrophilic in nature, meaning that it has a strong tendency to bind or absorb water. Thus, the moisture content for the starch and/or starch composite has been previously discussed herein. This is considered to be an important, or desirable, feature in the practice of this invention because water can also act somewhat as a plasticizer with the starch and which can sometimes associate with the plasticizer itself for the starch composite such as polyvinyl alcohol and cellulose acetate, or other plasticizer which contain similar functionalities such as esters of polyvinyl alcohol and/or cellulose acetate or any plasticizer which can depress the melting point of the starch.

Various grades of the starch/plasticizer composition can be developed to be used with various elastomer compositions and processing conditions.

The starch typically has a softening point in a range of about 180° C. to about 220° C., depending somewhat upon its ratio of amylose to amylopectin units, as well as other factors and, thus, does not readily soften when the rubber is conventionally mixed, for example, at a temperature in a range of about 140° C. to about 165° C. Accordingly, after the rubber is mixed, the starch remains in a solid particulate form, although it may become somewhat elongated under the higher shear forces generated while the rubber is being mixed with its compounding ingredients. Thus, the starch remains largely incompatible with the rubber and is typically present in the rubber composition in individual domains.

However, it is now considered herein that providing starch in a form of a starch composite of starch and a plasticizer is particularly beneficial in providing such a composition with a softening point in a range of about 110° C. to about 160° C.

The plasticizers can typically be combined with the starch such as, for example, by appropriate physical mixing processes, particularly mixing processes that provide adequate shear force.

The combination of starch and, for example, polyvinyl alcohol or cellulose acetate, is referred to herein as a "composite". Although the exact mechanism may not be completely understood, it is believed that the combination is not a simple mixture but is a result of chemical and/or physical interactions. It is believed that the interactions lead to a configuration where the starch molecules interact via the amylose with the vinyl alcohol, for example, of the plasticizer molecule to form complexes, involving perhaps chain entanglements. The large individual amylose molecules are believed to be interconnected at several points per molecule with the individual amylopectine molecules as a result of hydrogen bonding (which might otherwise also be in the nature of hydrophilic interactions).

This is considered herein to be beneficial because by varying the content and/or ratios of natural and synthetic components of the starch composite it is believed to be possible to alter the balance between hydrophobic and hydrophilic interactions between the starch components and the plasticizer to allow, for example, the starch composite filler to vary in form from spherical particles to fibrils.

In particular, it is considered herein that adding a polyvinyl alcohol to the starch to form a composite thereof, particularly when the polyvinyl alcohol has a softening point in a range of about 90° C. to about 130° C., can be beneficial to provide resulting starch/plasticizer composite having a softening point in a range of about 110° C. to about 160° C., and thereby provide a starch composite for blending well with a rubber composition during its mixing stage at a temperature, for example, in a range of about 110° C. to about 165° C. or 170° C.

Historically, the more homogeneous the dispersion of rubber compound components into the rubber, the better the resultant cured properties of that rubber. It is considered herein that it is a particular feature of this invention that the starch composite mixes with the rubber composition during the rubber mixing under high shear conditions and at a temperature in a range of about 140° C. to about 165° C., in a manner that very good dispersion in the rubber mixture is obtained. This is considered herein to be important because upon mixing the elastomer composition containing the starch/plasticizer composite to a temperature to reach the melting point temperature of the composite, the starch composite will contribute to the development of high shearing forces which is considered to be beneficial to ingredient dispersion within the rubber composition. Above the melting point of the starch composite, for example, around 150° C., it will melt and maximize its reaction with the coupling agent.

In practice, the rubber composition comprises a total of from about 5 to about 50 phr of the starch/plasticizer composite and rubber gel, wherein the weight ratio of starch/composite to rubber gel is from about 10:1 to about 1:10. Alternatively, the rubber composition may comprise a total of from about 5 to about 25 phr of the starch/plasticizer composite and rubber gel. Alternatively, the weight ratio of starch/composite to rubber gel is from about 5:1 to about 1:5.

In addition to the rubber gel and starch/plasticizer composite, the rubber component contains a rubber containing olefinic unsaturation. The phrase "rubber or elastomer containing olefinic unsaturation" is intended to include both natural rubber and its various raw and reclaim forms as well as various synthetic rubbers. In the description of this invention, the terms "rubber" and "elastomer" may be used interchangeably, unless otherwise prescribed. The terms "rubber composition", "compounded rubber" and "rubber compound" are used interchangeably to refer to rubber which has been blended or mixed with various ingredients and materials and such terms are well known to those having skill in the rubber mixing or rubber compounding art. Representative synthetic polymers are the homopolymerization products of butadiene and its homologues and derivatives, for example, methylbutadiene, dimethylbutadiene and pentadiene as well as copolymers such as those formed from butadiene or its homologues or derivatives with other unsaturated monomers. Among the latter are acetylenes, for example, vinyl acetylene; olefins, for example, isobutylene, which copolymerizes with isoprene to form butyl rubber; vinyl compounds, for example, acrylic acid, acrylonitrile (which polymerize with butadiene to form NBR), methacrylic acid and styrene, the latter compound polymerizing with butadiene to form SBR, as well as vinyl esters and various unsaturated aldehydes, ketones and ethers, e.g., acrolein, methyl isopropenyl ketone and vinylethyl ether. Specific examples of synthetic rubbers include neoprene (polychloroprene), polybutadiene (including cis 1,4-polybutadiene), polyisoprene (including cis 1,4-polyisoprene), butyl rubber, halobutyl rubber such as chlorobutyl rubber or bromobutyl rubber, styrene/isoprene/butadiene rubber, copolymers of 1,3-butadiene or isoprene with monomers such as styrene, acrylonitrile and methyl methacrylate, as well as ethylene/propylene terpolymers, also known as ethylene/propylene/diene monomer (EPDM), and in particular, ethylene/propylene/dicyclopentadiene terpolymers. Additional examples of rubbers which may be used include a carboxylated rubber, silicon-coupled and tin-coupled star-branched polymers. The preferred rubber or elastomers are polybutadiene and SBR.

In one aspect, the rubber to be combined with the rubber gel and starch/plasticizer composite may be a blend of at least two diene based rubbers. For example, a blend of two or more rubbers is preferred such as cis 1,4-polyisoprene rubber (natural or synthetic, although natural is preferred), 3,4-polyisoprene rubber, styrene/isoprene/butadiene rubber, emulsion and solution polymerization derived styrene butadiene rubbers, cis 1,4-polybutadiene rubbers and emulsion polymerization prepared butadiene/acrylonitrile copolymers.

In one aspect of this invention, an emulsion polymerization derived styrene butadiene (E-SBR) might be used having a relatively conventional styrene content of about 20 to about 28 percent bound styrene or, for some applications, an E-SBR having a medium to relatively high bound styrene content, namely, a bound styrene content of about 30 to about 45 percent.

When used in the tire tread, the relatively high styrene content of about 30 to about 45 for the E-SBR can be considered beneficial for a purpose of enhancing traction, or skid resistance. The presence of the E-SBR itself is considered beneficial for a purpose of enhancing processability of the uncured elastomer composition mixture, especially in comparison to a utilization of a solution polymerization prepared SBR (S-SBR).

By emulsion polymerization prepared E-SBR, it is meant that styrene and 1,3-butadiene are copolymerized as an aqueous emulsion. Such are well known to those skilled in such art. The bound styrene content can vary, for example, from about 5 to about 50 percent. In one aspect, the E-SBR may also contain acrylonitrile to form a terpolymer rubber, as E-SBAR, in amounts, for example, of about 2 to about 30 weight percent bound acrylonitrile in the terpolymer.

Emulsion polymerization prepared styrene/butadiene/acrylonitrile copolymer rubbers containing about 2 to about 40 weight percent bound acrylonitrile in the copolymer are also contemplated as diene based rubbers for use in this invention.

The solution polymerization prepared SBR (S-SBR) typically has a bound styrene content in a range of about 5 to about 50, preferably about 9 to about 36, percent. The S-SBR can be conveniently prepared, for example, by organo lithium catalyzation in the presence of an organic hydrocarbon solvent.

A purpose of using S-SBR is for improved tire rolling resistance as a result of lower hysteresis when it is used in a tire tread composition.

The 3,4-polyisoprene rubber (3,4-PI) is considered beneficial for a purpose of enhancing the tire's traction when it is used in a tire tread composition. The 3,4-PI and use thereof is more fully described in U.S. Pat. No. 5,087,668 which is incorporated herein by reference.

The cis 1,4-polybutadiene rubber (BR) is considered to be beneficial for a purpose of enhancing the tire tread's wear, or treadwear. Such BR can be prepared, for example, by organic solution polymerization of 1,3-butadiene. The BR may be conveniently characterized, for example, by having at least a 90 percent cis 1,4-content.

The term "phr" as used herein, and according to conventional practice, refers to "parts by weight of a respective material per 100 parts by weight of rubber, or elastomer."

In addition to the rubber gel, starch/plasticizer composite and rubber containing olefinic unsaturation in the rubber component of the tire, conventional fillers including carbon black and silica may be also present. The amount of such conventional fillers may range from 0 to 250 phr. Preferably, the filler is present in an amount ranging from 0 to 100 phr. Alternatively, the filler is present is an amount ranging from about 20 to about 80 phr.

The commonly-employed siliceous pigments which may be used in the rubber compound include conventional pyrogenic and precipitated siliceous pigments (silica), although precipitated silicas are preferred. The conventional siliceous pigments preferably employed in this invention are precipitated silicas such as, for example, those obtained by the acidification of a soluble silicate, e.g., sodium silicate.

Such conventional silicas might be characterized, for example, by having a BET surface area, as measured using nitrogen gas, preferably in the range of about 40 to about 600, and more usually in a range of about 50 to about 300 square meters per gram. The BET method of measuring surface area is described in the *Journal of the American Chemical Society*, Volume 60, Page 304 (1930).

The conventional silica may also be typically characterized by having a dibutylphthalate (DBP) absorption value in a range of about 100 to about 400, and more usually about 150 to about 300.

The conventional silica might be expected to have an average ultimate particle size, for example, in the range of 0.01 to 0.05 micron as determined by the electron microscope, although the silica particles may be even smaller, or possibly larger, in size.

Various commercially available silicas may be used, such as, only for example herein, and without limitation, silicas commercially available from PPG Industries under the Hi-Sil trademark with designations 210, 243, etc; silicas available from Rhone-Poulenc, with, for example, designations of Z165 MP and Z165GR and silicas available from Degussa AG with, for example, designations VN2 and VN3, etc.

Commonly employed carbon blacks can be used as a conventional filler. Representative examples of such carbon blacks include N110, N115, N121, N134, N220, N231, N234, N242, N293, N299, S315, N326, N330, M332, N339, N343, N347, N351, N358, N375, N539, N550, N582, N630, N642, N650, N660, N683, N754, N762, N765, N774, N787, N907, N908, N990 and N991. These carbon blacks have iodine absorptions ranging from 9 to 170 g/kg and DBP No. ranging from 34 to 150 cm³/100 g.

It may be preferred to have the rubber composition for use in the tire component to additionally contain a conventional sulfur containing organosilicon compound. Examples of suitable sulfur containing organosilicon compounds are of the formula:

Z-Alk-S$_n$-Alk-Z in which Z is selected from the group consisting of

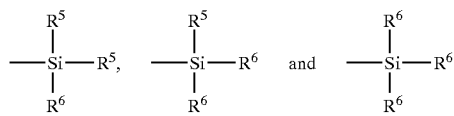

where $R^5$ is an alkyl group of 1 to 4 carbon atoms, cyclohexyl or phenyl; $R^6$ is alkoxy of 1 to 8 carbon atoms, or cycloalkoxy of 5 to 8 carbon atoms; Alk is a divalent hydrocarbon of 1 to 18 carbon atoms and n is an integer of 2 to 8.

Specific examples of sulfur containing organosilicon compounds which may be used in accordance with the present invention include: 3,3'-bis(trimethoxysilylpropyl) disulfide, 3,3'-bis (triethoxysilylpropyl) disulfide, 3,3'-bis (triethoxysilylpropyl) tetrasulfide, 3,3'-bis (triethoxysilylpropyl) octasulfide, 3,3'-bis (trimethoxysilylpropyl) tetrasulfide, 2,2'-bis (triethoxysilylethyl) tetrasulfide, 3,3'-bis (trimethoxysilylpropyl) trisulfide, 3,3'-bis (triethoxysilylpropyl) trisulfide, 3,3'-bis (tributoxysilylpropyl) disulfide, 3,3'-bis (trimethoxysilylpropyl) hexasulfide, 3,3'-bis (trimethoxysilylpropyl) octasulfide, 3,3'-bis (trioctoxysilylpropyl) tetrasulfide, 3,3'-bis (trihexoxysilylpropyl) disulfide, 3,3-bis(tri-2"-ethylhexoxysilylpropyl) trisulfide, 3,3'-bis (triisooctoxysilylpropyl) tetrasulfide, 3,3'-bis(tri-t-butoxysilylpropyl) disulfide, 2,2'-bis(methoxy diethoxy silyl ethyl) tetrasulfide, 2,2'-bis(tripropoxysilylethyl) pentasulfide, 3,3'-bis(tricyclonexoxysilylpropyl) tetrasulfide, 3,3'-bis(tricyclopentoxysilylpropyl) trisulfide, 2,2'-bis(tri-2"-methylcyclohexoxysilylethyl) tetrasulfide, bis(trimethoxysilylmethyl) tetrasulfide, 3-methoxy ethoxy propoxysilyl 3'-diethoxybutoxy-silylpropyltetrasulfide, 2,2'-bis (dimethyl methoxysilylethyl) disulfide, 2,2'-bis(dimethyl sec.butoxysilylethyl) trisulfide, 3,3'-bis(methyl butylethoxysilylpropyl) tetrasulfide, 3,3'-bis(di t-butylmethoxysilylpropyl) tetrasulfide, 2,2'-bis(phenyl methyl methoxysilylethyl) trisulfide, 3,3'-bis(diphenyl isopropoxysilylpropyl) tetrasulfide, 3,3'-bis(diphenyl cyclohexoxysilylpropyl) disulfide, 3,3'-bis(dimethyl ethylmercaptosilylpropyl) tetrasulfide, 2,2'-bis(methyl dimethoxysilylethyl) trisulfide, 2,2'-bis(methyl ethoxypropoxysilylethyl) tetrasulfide, 3,3'-bis(diethyl methoxysilylpropyl) tetrasulfide, 3,3'-bis(ethyl di-sec. butoxysilylpropyl) disulfide, 3,3'-bis(propyl diethoxysilylpropyl) disulfide, 3,3'-bis(butyl dimethoxysilylpropyl) trisulfide, 3,3'-bis(phenyl dimethoxysilylpropyl) tetrasulfide, 3-phenyl ethoxybutoxysilyl 3'-trimethoxysilylpropyl tetrasulfide, 4,4'-bis (trimethoxysilylbutyl) tetrasulfide, 6,6'-bis (triethoxysilylhexyl) tetrasulfide, 12,12'-bis (triisopropoxysilyl dodecyl) disulfide, 18,18'-bis (trimethoxysilyloctadecyl) tetrasulfide, 18,18'-bis (tripropoxysilyloctadecenyl) tetrasulfide, 4,4'-bis (trimethoxysilyl-buten-2-yl) tetrasulfide, 4,4'-bis (trimethoxysilylcyclohexylene) tetrasulfide, 5,5'-bis (dimethoxymethylsilylpentyl) trisulfide, 3,3'-bis (trimethoxysilyl-2-methylpropyl) tetrasulfide, 3,3'-bis (dimethoxyphenylsilyl-2-methylpropyl) disulfide.

The preferred sulfur containing organosilicon compounds are the 3,3'-bis(trimethoxy or triethoxy silylpropyl) sulfides. The most preferred compounds are 3,3'-bis (triethoxysilylpropyl) disulfide and 3,3'-bis (triethoxysilylpropyl) tetrasulfide. Therefore as to the above formula, preferably Z is

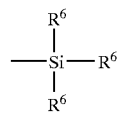

where $R^6$ is an alkoxy of 2 to 4 carbon atoms, with 2 carbon atoms being particularly preferred; alk is a divalent hydrocarbon of 2 to 4 carbon atoms with 3 carbon atoms being particularly preferred; and n is an integer of from 2 to 5 with 2 and 4 being particularly preferred.

The amount of the sulfur containing organosilicon compound of the above formula in a rubber composition will vary depending on the level of other additives that are used. Generally speaking, the amount of the compound of the above formula will range from 0.5 to 20 phr. Preferably, the amount will range from 1 to 10 phr.

It is readily understood by those having skill in the art that the rubber composition would be compounded by methods generally known in the rubber compounding art, such as mixing the various sulfur-vulcanizable constituent rubbers with various commonly used additive materials such as, for example, sulfur donors, curing aids, such as activators and retarders and processing additives, such as oils, resins including tackifying resins and plasticizers, fillers, pigments, fatty acid, zinc oxide, waxes, antioxidants and antiozonants and peptizing agents. As known to those skilled in the art, depending on the intended use of the sulfur vulcanizable and sulfur-vulcanized material (rubbers), the additives mentioned above are selected and commonly used in conventional amounts. Representative examples of sulfur donors include elemental sulfur (free sulfur), an amine disulfide, polymeric polysulfide and sulfur olefin adducts. Preferably, the sulfur-vulcanizing agent is elemental sulfur. The sulfur-vulcanizing agent may be used in an amount ranging from 0.5 to 8 phr, with a range of from 1.5 to 6 phr being preferred. Typical amounts of tackifier resins, if used, comprise about 0.5 to about 10 phr, usually about 1 to about 5 phr. Typical amounts of processing aids comprise about 1 to about 50 phr. Such processing aids can include, for example, aromatic, naphthenic, and/or paraffinic processing oils. Typical amounts of antioxidants comprise about 1 to about 5 phr. Representative antioxidants may be, for example, diphenyl-p-phenylenediamine and others, such as, for example, those disclosed in The Vanderbilt Rubber Handbook (1978), Pages 344 through 346. Typical amounts of antiozonants comprise about 1 to 5 phr. Typical amounts of fatty acids, if used, which can include stearic acid comprise about 0.5 to about 3 phr. Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

Accelerators are used to control the time and/or temperature required for vulcanization and to improve the properties of the vulcanizate. In one embodiment, a single accelerator system may be used, i.e., primary accelerator. The primary accelerator(s) may be used in total amounts ranging from about 0.5 to about 4, preferably about 0.8 to about 1.5, phr. In another embodiment, combinations of a primary and a secondary accelerator might be used with the secondary accelerator being used in smaller amounts, such as from about 0.05 to about 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

The mixing of the rubber composition can be accomplished by methods known to those having skill in the rubber mixing art. For example the ingredients are typically mixed in at least two stages, namely at least one non-productive stage followed by a productive mix stage. The final curatives including sulfur-vulcanizing agents are typically mixed in the final stage which is conventionally called the "productive" mix stage in which the mixing typically occurs at a temperature, or ultimate temperature, lower than the mix temperature(s) than the preceding non-productive mix stage(s). The rubber and compound is mixed in one or more non-productive mix stages. The terms "non-productive" and "productive" mix stages are well known to those having skill in the rubber mixing art. If the rubber composition contains a sulfur containing organosilicon compound, one may subject the rubber composition to a thermomechanical mixing step. The thermomechanical mixing step generally comprises a mechanical working in a mixer or extruder for a period of time suitable in order to produce a rubber temperature between 140° C. and 190° C. The appropriate duration of the thermomechanical working varies as a function of the operating conditions and the volume and nature of the components. For example, the thermomechanical working may be from 1 to 20 minutes.

The rubber composition containing the rubber gel, starch/plasticizer composite, filler and rubber containing olefinic unsaturation may be incorporated in a variety of rubber components of the tire. For example, the rubber component may be a tread (including tread cap and tread base), sidewall, apex, chafer, sidewall insert, wirecoat, innerliner, and ply coat. Preferably, the compound is a sidewall insert or a tread cap or tread base.

The pneumatic tire of the present invention may be a passenger tire, motorcycle tire, aircraft tire, agricultural, earthmover, off-the-road, truck tire and the like. The term "truck tire" includes light truck, medium truck and heavy truck. Preferably, the tire is a passenger or truck tire. The tire may also be a radial or bias, with a radial being preferred.

Vulcanization of the pneumatic tire of the present invention is generally carried out at conventional temperatures ranging from about 100° C. to 200° C. Preferably, the vulcanization is conducted at temperatures ranging from about 110° C. to 180° C. Any of the usual vulcanization processes may be used such as heating in a press or mold, heating with superheated steam or hot air.

Upon vulcanization of the sulfur-vulcanized composition, the rubber composition of this invention can be used for various purposes. For example, the sulfur-vulcanized rubber composition may be in the form of a tire, belt or hose. In case of a tire, it can be used for various tire components. Such tires can be built, shaped, molded and cured by various methods which are known and will be readily apparent to those having skill in such art. As can be appreciated, the tire may be a passenger tire, aircraft tire, truck tire and the like. Preferably, the tire is a passenger tire. The tire may also be a radial or bias, with a radial tire being preferred.

EXAMPLE 1

In this Example, a rubber gel and a starch/plasticizer composite were evaluated in a rubber composition.

Rubber compositions containing the materials set out in Table 1 was prepared using three separate stages of addition (mixing); namely two non-productive mix stages and one productive mix stage. The non-productive stages were mixed for two minutes at a rubber temperature of 160° C. The drop temperature for the productive mix stage was 115° C.

The rubber compositions are identified as Sample 1 through Sample 6. The Samples were cured at about 160° C. for about 14 minutes. Table 2 illustrates the physical properties of the cured Samples 1 through 6.

TABLE 1

|  | Samples | | | | | |
| --- | --- | --- | --- | --- | --- | --- |
|  | 1 | 2 | 3 | 4 | 5 | 6 |
| First Non-Productive Mix | | | | | | |
| Cis-1,4 polybutadiene[1] | 30 | 30 | 30 | 30 | 30 | 30 |
| SBR[2] | 96.25 | 96.25 | 96.25 | 96.25 | 96.2 | 96.25 |
| Wax | 1.5 | 1.5 | 1.5 | 1.5 | 1.5 | 1.5 |
| Stearic Acid | 3 | 3 | 3 | 3 | 3 | 3 |
| silica | 66.88 | 58.75 | 50.63 | 50.63 | 50.63 | 75 |
| Coupling Agent[3] | 10.7 | 9.4 | 8.1 | 8.1 | 8.1 | 12 |
| Antidegradant[4] | 0.75 | 0.75 | 0.75 | 0.75 | 0.75 | 0.75 |
| Second Non-Productive Mix | | | | | | |
| Starch/Plasticizer[5] | 2.5 | 5 | 5 | 10 | 7.5 | 0 |
| SBR Gel[6] | 2.5 | 5 | 10 | 5 | 7.5 | 0 |
| Coupling Agent[7] | 1.62 | 3.25 | 4.87 | 4.87 | 4.87 | 0 |
| Antidegradant[4] | 1.75 | 1.75 | 1.75 | 1.75 | 1.75 | 1.75 |
| Productive Mix | | | | | | |
| Zinc Oxide | 2.5 | 2.5 | 2.5 | 2.5 | 2.5 | 2.5 |
| Sulfur | 1.7 | 1.7 | 1.7 | 1.7 | 1.7 | 1.7 |
| Accelerators[8] | 3.35 | 3.25 | 3.2 | 3.1 | 3.15 | 3.6 |
| Antidegradants[4] | 0.5 | 0.5 | 0.5 | 0.5 | 0.5 | 0.5 |

[1]Budene 1207 from The Goodyear Tire & Rubber Company
[2]Solution polymerized SBR extended with 37.5 phr aromatic oil
[3]50% organosilicon sulfide type on carbon black carrier
[4]phenylenediamine type
[5]A composite of starch and poly(ethylenevinyl alcohol) in a weight ratio of about 1.5/1 and having a softening point according to ASTM No. D1228 of about 147° C.; wherein the starch is composed of amylose units and amylopectin units in a weight ratio of about 1/3 and a moisture content of about 5 weight percent obtained as Mater Bi 1128R from the Novamont - Montedison Company
[6]SBR gel, 23% styrene, cured with 2 phr of dicumyl peroxide, with an average diameter of 50 nm, surface area 54 $m^2/g$, $T_g$ of −17° C., gel content 96 wt %, and $Q_i$ = 4.7.
[7]organosilicon sulfide type
[8]sulfenamide and guanidine type

TABLE 2

| | Samples | | | | | |
|---|---|---|---|---|---|---|
| | 1 | 2 | 3 | 4 | 5 | 6 |
| Shore A | 64.9 | 63.5 | 60.2 | 62.1 | 61.6 | 62.2 |
| Rebound 0° C., % | 11.1 | 11.7 | 12.1 | 12.3 | 12.1 | 9.5 |
| Rebound 100° C., % | 70.3 | 73.6 | 74.3 | 75 | 75 | 67.8 |
| Elong. @ break, % | 371.3 | 354 | 344.4 | 319.6 | 347.9 | 406 |
| 100% Modulus, MPa | 3.1 | 2.5 | 2.3 | 2.6 | 2.5 | 2 |
| 300% Modulus, MPa | 15.8 | 11.9 | 10.6 | 11.2 | 11.5 | 11.6 |
| Specific Gravity | 1.177 | 1.156 | 1.135 | 1.142 | 1.14 | 1.192 |
| Tensile Strength, MPa | 18.9 | 13.4 | 11.5 | 11.2 | 12.6 | 16.3 |
| Abrasion Loss, DIN | 91.3 | 98.6 | 102.3 | 101.4 | 90.8 | 96.9 |

It can be seen from Table 2 that an advantageous balance of physical properties is obtained in rubber compositions comprising both the rubber gel and the starch/plasticizer composite. A significant gain in rolling resistance as indicated by the rebound at 100° C. can be achieved while maintaining acceptable ultimate properties and good abrasion. Also, the compound specific gravity can be significantly reduced leading to low weight components.

While certain representative embodiments and details have been shown for the purpose of illustrating the invention, it will be apparent to those skilled in this art that various changes and modifications may be made therein without departing from the spirit or scope of the invention.

What is claimed is:

1. A pneumatic tire having a rubber component comprised of
   (A) 100 parts by weight (phr) of an ethylenically unsaturated rubber;
   (B) from 0 to 100 phr of a filler selected from carbon black and silica; and
   (C) from 5 to 50 phr of a combination of a starch/plasticizer composite and a rubber gel,
wherein said rubber gel is selected from the group consisting of polybutadiene gel, styrene butadiene rubber gel, acrylonitrile-butadiene rubber gel, chloroprene rubber gel, natural rubber gel, and mixtures thereof, wherein the weight ratio of starch/composite to rubber gel is from about 10:1 to about 1:10.

2. The pneumatic tire of claim 1 wherein said starch/plasticizer composite comprises amylose units and amylopectin units in a ratio of about 15/85 to about 35/65 and has a softening point according to ASTM No. D1228 in a range of about 180° C. to about 220° C.; and the starch/plasticizer has a softening point in a range of about 110° C. to about 170° C. according to ASTM No. D1228.

3. The pneumatic tire of claim 1 wherein said rubber gel is polybutadiene gel.

4. The pneumatic tire of claim 1 wherein said rubber gel is a styrene butadiene gel.

5. The pneumatic tire of claim 4 wherein said rubber gel is grafted with a polar unsaturated monomer.

6. The pneumatic tire of claim 5 wherein said polar unsaturated monomer is selected from the group consisting of acrylic acid, methacrylic acid, acrylamide, methacrylamide, N-methoxymethyl methacrylic acid amide, N-acetoxxymethyl methacrylic acid amide, acrylonitrile, dimethyl acrylamide, hydroxyethyl acrylate, hydroxyethyl methacrylate, hydroxypropyl acrylate, hydroxypropyl methacrylate, hydroxybutyl acrylate, hydroxybutyl methacrylate.

7. The pneumatic tire of claim 5 wherein from 1 to 20 weight percent of said rubber gel is derived from said polar unsaturated monomer.

8. The pneumatic tire of claim 1 wherein said rubber is selected from the group consisting of natural rubber, neoprene, polyisoprene, butyl rubber, halobutyl rubber, polybutadiene, styrene butadiene copolymer, styrene/isoprene/butadiene rubber, methyl methacrylate-butadiene copolymer, isoprene-styrene copolymer, methyl methacrylate-isoprene copolymer, acrylonitrile-isoprene copolymer, acrylonitrile-butadiene copolymer, carboxylated rubber, EPDM, silicon-coupled star-branched polymers, tin-coupled star-branched polymers and mixtures thereof.

9. The pneumatic tire of claim 1 wherein from 0.5 to 20 phr of a sulfur containing organosilicon compound is present and is of the formula:

in which Z is selected from the group consisting of

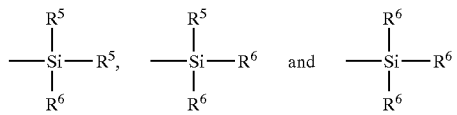

where $R^5$ is an alkyl group of 1 to 4 carbon atoms, cyclohexyl or phenyl; $R^6$ is alkoxy of 1 to 8 carbon atoms, or cycloalkoxy of 5 to 8 carbon atoms; Alk is a divalent hydrocarbon of 1 to 18 carbon atoms and n is an integer of 2 to 8.

10. The pneumatic tire of claim 1 wherein said composition is thermomechanically mixed at a rubber temperature in a range of from 140° C. to 190° C. for a total mixing time of from 1 to 20 minutes.

11. The pneumatic tire of claim 1 wherein said tire is selected from the group consisting of passenger tires, motorcycle tires, aircraft tires, agricultural, earthmover, off-the-road and truck tires.

12. A pneumatic tire of claim 1 wherein said rubber component is selected from the group consisting of a tread cap, tread base, sidewall, apex, chafer, sidewall insert, innerliner, wirecoat and ply coat.

13. The pneumatic tire of claim 1 wherein said rubber gel has a particle diameter of from 20 to 1,000 nm.

14. The pneumatic tire of claim 1 wherein said rubber gel has a swelling index (Qi) in toluene of from 1 to 15.

15. The pneumatic tire of claim 1 wherein from 20 to 80 phr of silica and carbon black are present.

16. The pneumatic tire of claim 1 wherein the ratio of starch/plasticizer composite to rubber gel is from about 5:1 to about 1:5.

17. The pneumatic tire of claim 1 wherein from 5 to 25 phr of starch/plasticizer composite and rubber gel are present.

* * * * *